(12) United States Patent
Gibbons

(10) Patent No.: US 11,188,859 B2
(45) Date of Patent: Nov. 30, 2021

(54) INTEGRATED BUSINESS OPERATIONS EFFICIENCY RISK MANAGEMENT

(71) Applicant: Agile Business Intelligence, Inc., Burien, WA (US)

(72) Inventor: Blake Gibbons, Bremerton, WA (US)

(73) Assignee: Agile Business Intelligence, Inc., Burien, WA (US)

( * ) Notice: Subject to any disclaimer, the term of this patent is extended or adjusted under 35 U.S.C. 154(b) by 407 days.

(21) Appl. No.: 16/108,058

(22) Filed: Aug. 21, 2018

(65) Prior Publication Data

US 2020/0065726 A1    Feb. 27, 2020

(51) Int. Cl.
| | |
|---|---|
| *G06Q 10/06* | (2012.01) |
| *G07C 5/08* | (2006.01) |
| *G06F 40/174* | (2020.01) |
| *G06F 12/14* | (2006.01) |
| *G02B 6/44* | (2006.01) |

(52) U.S. Cl.
CPC ..... *G06Q 10/0635* (2013.01); *G06F 12/1483* (2013.01); *G06F 40/174* (2020.01); *G06Q 10/063* (2013.01); *G06Q 10/06393* (2013.01); *G06Q 10/06395* (2013.01); *G07C 5/0841* (2013.01); *G02B 6/4411* (2013.01); *G05B 2219/31461* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,698,148 B2 * | 4/2010 | Lavu | ........... | G06Q 10/0635 705/1.1 |
| 8,087,090 B2 * | 12/2011 | Cheng | ........... | G06F 21/604 726/27 |
| 9,940,182 B1 * | 4/2018 | Stott | ........... | G06Q 10/06395 |

(Continued)

FOREIGN PATENT DOCUMENTS

WO    WO-2017050458 A1 *    3/2017    ........... H04W 40/22

OTHER PUBLICATIONS

J. Hewitt and J. Pham, "Qualitative Versus Quantitative Methods in Safety Risk Management," 2018 Annual Reliability and Maintainability Symposium (RAMS), 2018, pp. 1-6, doi: 10.1109/RAM. 2018.8463052. (Year: 2018).*

*Primary Examiner* — Crystol Stewart
(74) *Attorney, Agent, or Firm* — Wooshik Shim; Bold IP, PLLC

(57) ABSTRACT

A method for closed-loop real-time lifecycle risk management identifies, assesses, reviews and mitigates risks. Historically identified data stored in the databases are loaded, one or more users fill out questionnaires and various factors contributing to determination of the risks are calculated. If a risk is classified as an intolerable risk, the risk is notified to interested parties. A user may use the integrated risk management system to systematically and accurately identify a root cause of an error. The user may start from the highest level of the lifecycle of a product and assess the risk, followed by narrowing down the scope of an error by successively going down to lower production levels of the product. The steps may be processed in real time using remote devices connected to a server. The system allows different access levels to various users.

19 Claims, 19 Drawing Sheets

(56) References Cited

U.S. PATENT DOCUMENTS

| | | | |
|---|---|---|---|
| 2003/0125997 A1* | 7/2003 | Stoltz | G06Q 10/0635 |
| | | | 705/7.28 |
| 2006/0122873 A1* | 6/2006 | Minotto | G06Q 10/10 |
| | | | 705/2 |
| 2007/0294118 A1* | 12/2007 | Tait | G06Q 10/0635 |
| | | | 705/7.28 |
| 2009/0070170 A1* | 3/2009 | Krishnamurthy | G06Q 10/0635 |
| | | | 705/7.28 |
| 2010/0042451 A1* | 2/2010 | Howell | G06Q 10/0635 |
| | | | 705/7.28 |
| 2011/0270647 A1* | 11/2011 | Huang | G06Q 10/0635 |
| | | | 705/7.28 |
| 2013/0006701 A1* | 1/2013 | Guven | G06Q 10/0635 |
| | | | 705/7.28 |
| 2013/0325544 A1* | 12/2013 | Bonin | G06Q 10/0635 |
| | | | 705/7.28 |
| 2015/0227868 A1* | 8/2015 | Saraf | G06Q 10/0635 |
| | | | 705/7.28 |
| 2015/0262105 A1* | 9/2015 | Jeffries | G06Q 30/018 |
| | | | 705/7.26 |
| 2016/0378618 A1* | 12/2016 | Cmielowski | G06F 11/3452 |
| | | | 714/38.1 |
| 2017/0061538 A1* | 3/2017 | Ridgley | G06Q 40/04 |
| 2017/0236234 A1* | 8/2017 | Guenab | G06Q 50/30 |
| | | | 705/7.28 |

\* cited by examiner

| Risk Assessment Matrix ( R = L × S ) | | | | | | |
|---|---|---|---|---|---|---|
| Risk Likelihood (L) 202 | | Risk Severity (S) 204 | | | | |
| Value (L) | Meaning | Catastropic A | Hazardous B | Major C | Minor D | Negligible E |
| 5 | Frequent | 5A | 5B | 5C | 5D | 5E |
| 4 | Occasional | 4A | 4B | 4C | 4D | 4E |
| 3 | Remote | 3A | 3B | 3C | 3D | 3E |
| 2 | Improbable | 2A | 2B | 2C | 2D | 2E |
| 1 | Extremely Impossible | 1A | 1B | 1C | 1D | 1E |

| | D = Detectability of IP error subject to QMS | |
|---|---|---|
| Q1 | Would a failure of this process step physically prevent a subsequent operation?<br>*Tip: Failure substantially changes standard work procedures* | y / n |
| Q2 | Is the process step part of a surveillance plan? (random witness of a process)<br>*Tip: Process Monitoring* | y / n |
| Q3 | Is there a witness inspection that would detect this potential failure mode? (Concurrent inspection, two sets of eyes)<br>*Tip: Watching actual process (Torque, Functional Test, etc.)* | y / n |
| Q4 | Is there an in-process test or measurement that would detect a failure of this process step?<br>Ex. Volt meter, go-no-go gages, functional test instrumentation<br>*Tip: Detection method can be in a follow-on installation plan* | y / n |
| Q5 | Does this process step require post process inspection?<br>*Tip: Application of Seal, grease* | y / n |
| Q6 | Is the process step part of a sampling plan? (end-item inspection sampled)<br>*Tip: Lot Sampling Plans* | y / n |
| Q7 | Would the potential failure mode result in a visible difference to the hardware or documentation?<br>*Tip: Can the process be visually inspected?* | y / n |
| Q8 | Would a failure of this process step be detected at end-item verification? Job<br>*Tip: Job Sampling* | y / n |
| Q9 | Is the process step only manufacturing self examined? | y / n |
| | Detectability (<=) | 10% | 81% | 90% | 96% | 99% |
| | Number of "yeses" to IP step | 5 | 4 | 3 | 2 | 1 |
| | D Input for Risk Cube | | | | | |

FIG. 5A

| | O = Occurrence of IP failure subject to human factors | | |
|---|---|---|---|
| Q1 | Is this a blind installation<br>*Tip: Mechanic is installing by feel only, no visual* | y / n | |
| Q2 | Are the drawing / PDD requirements unclear<br>*Tip: Include shop practices, tribal knowledge, drawing and IP conflicts, etc* | y / n | |
| Q3 | Are there access issues<br>*Tip: Design complicates access* | y / n | |
| Q4 | Are there ergonomics / Human Factors / Industrial Safety or Accessibility issues?<br>*Tip: Examples include sizing range, position, weight and location of work, lighting, time before fatigue of position, etc.)* | y / n | |
| Q5 | Are there tooling issues?<br>*Tip: Inadequate space for tool application (tool sweep - greater than 60 degrees desirable), tool certification, etc.* | y / n | |
| Q6 | Is this a complex installation / design?<br>*Tip: Is the installation not mistake-proof?* | y / n | |
| Q7 | Are there follow-on related process steps?<br>*Tip: Safety device installation, sequencing of specific steps, etc.* | y / n | |
| Q8 | Is there a possibility that the job is split between shifts/mechanics?<br>*Tip: Non-Conformance Report?* | y / n | |
| Q9 | Is special training/certification required? | y / n | |
| Q10 | Are there additional contributing factors to potential occurrence?<br>*Tip: Dust, temperature, drilling, congested work area, etc* | y / n | |
| | Occurrence (<=) | 10% | 81% | 90% | 96% | 99% |
| | Number of "yeses" to IP step | 5 | 4 | 3 | 2 | 1 |
| | O Input for Risk Cube | 5 | 4 | 3 | 2 | 1 |

FIG. 5B

| Severity (S) | | | | |
|---|---|---|---|---|
| External Escapement | Internal Escapement | | | No Escapement |
| Airline / In-Service 510 A | Test Flight / Delivery 508 B | Pre-flight 506 C | Downstream Production Line 504 D | Immediate Production Line 502 E |

FIG. 5C

| Level | Example |
|---|---|
| Company 1010 | Boeing |
| Division 1020 | BCA, BDS |
| Program 1030 | 737 Max, 787 |
| Aircraft Serial Number / ID Number 1040 | 101, 102, ..., 210 |
| Commodity 1050 | Fuel System, Engine System |
| Sub-commodity 1060 | General, Storage, Distribution-Drain Valves, Dump, Indicating |
| Task 1070 | Filling out task cards |

1000

Production System Risk Assessment
Boeing – BAC – 737 Max: by Aircraft Production Numbers

1100

| 1 | 2 | 3 | 4 | 5 | 6 | 7 | 8 | 9 | 10 |
|---|---|---|---|---|---|---|---|---|---|
| 11 | 12 | 13 | 14 | 15 | 16 | 17 | 18 | 19 | 20 |
| 21 | 22 | 23 | 24 | 25 | 26 | 27 | 28 | 29 | 30 |
| 31 | 32 | 33 | 34 | 35 | 36 | 37 | 38 | 39 | 40 |
| 41 | 42 | 43 | 44 | 45 | 46 | 47 | 48 | 49 | 50 |
| 51 | 52 | 53 | 54 | 55 | 56 | 57 | 58 | 59 | 60 |
| 61 | 62 | 63 | 64 | 65 | 66 | 67 | 68 | 69 | 70 |
| 71 | 72 | 73 | 74 | 75 | 76 | 77 | 78 | 79 | 80 |
| 81 | 82 | 83 | 84 | 85 | 86 | 87 | 88 | 89 | 90 |
| 91 | 92 | 93 | 94 | 95 | 96 | 97 | 98 | 99 | 100 |
| 101 | 102 | 103 | 104 | 105 | 106 | 107 | 108 | 109 | 110 |
| 111 | 112 | 113 | 114 | 115 | 116 | 117 | 118 | 119 | 120 |
| 121 | 122 | 123 | 124 | 125 | 126 | 127 | 128 | 129 | 130 |
| 131 | 132 | 133 | 134 | 135 | 136 | 137 | 138 | 139 | 140 |
| 141 | 142 | 143 | 144 | 145 | 146 1110 | 147 | 148 | 149 | 150 |
| 151 | 152 | 153 | 154 | 155 | 156 | 157 | 158 | 159 | 160 |
| 161 | 162 | 163 | 164 | 165 | 166 | 167 | 168 | 169 | 170 |
| 171 | 172 | 173 | 174 | 175 | 176 | 177 | 178 | 179 | 180 |
| 181 | 182 | 183 | 184 | 185 | 186 | 187 | 188 | 189 | 190 |
| 191 | 192 | 193 | 194 | 195 | 196 | 197 | 198 | 199 | 200 |

FIG. 11

Production System Risk Assessment
Boeing – BAC – 737 Max – Aircraft ID 146: by Commodity

| 1 | 2 | 3 | 4 | 5 | 6 | 7 | 8 | 9 | 10 |
|---|---|---|---|---|---|---|---|---|---|
| 11 | 12 | 13 | 14 | 15 | 16 | 17 | 18 | 19 | 20 |
| 21 | 22 | 23 | 24 | 25 | 26 | 27 | 28 | 29 | 30 |
| 31 | 32 | 33 | 34 | 35 | 36 | 37 | 38 | 39 | |
| 41 | 42 | | 44 | 45 | 46 | 47 | | 49 | 50 |
| 51 | 52 | 53 | 54 | 55 | 56 | 57 | | | 60 |
| 61 | 62 | 63 | 64 | 65 | 66 | 67 | | | 70 |
| 71 | 72 | 73 | 74 | 75 | 76 | 77 | 78 | 79 | 80 |
| 81 | 82 | 83 | 84 | | | | | | |
| 91 | | | | | | 97 | | | 100 |
| 101 | 102 | 103 | 104 | 105 | 106 | | | | |
| | | | | 115 | 116 | 117 | | | |
| | | | | | | | 300 | | |

Production System Risk Assessment
Aircraft ID 146 – Commodity 28

1300

| Commodity #28 Fuel | Risk Tolerability |
|---|---|
| 00 General 1310 | |
| 10 Storage 1320 | ■ |
| 20 Distribution-Drain Valves 1330 | |
| 30 Dump 1340 | |
| 40 Indicating 1350 | |

FIG. 13

Production System Risk Assessment
Commodity 28 – Sub-Commodity 10

| Task Card Numbers: | | | | | | | | | |
|---|---|---|---|---|---|---|---|---|---|
| 1 | 2 | 3 | 4 | 5 | 6 | 7 | 8 | 9 | 10 |
| 11 | 12 | 13 | 14 | 15 | 16 | 17 | 18 | 19 | 20 |
| 21 | 22 | 23 | 24 | 25 | 26 | 27 | 28 | 29 | 30 |

INTEGRATED BUSINESS OPERATIONS EFFICIENCY RISK MANAGEMENT

TECHNICAL FIELD

The present description includes embodiments generally directed to an integrated system and method for risk management by proactively identifying and mitigating risks.

BACKGROUND

The Three Mile Island accident was a partial nuclear meltdown which occurred in a nuclear reactor on Mar. 28, 1979. Subsequent investigation was conducted to understand the cause of the accident and to develop a methodology to detect potential risks of similar accidents and avoid them. It was found that human factors were a key aspect of understanding and quantifying risk, in conjunction with the safety culture of the organization.

Thus, the Three Mile Island and other accidents brought attention to the need for a form of systemic risk management methodology that is predictive, proactive, repeatable, and is centric to safety culture. As a result, the concept of safety management system (SMS) emerged over the subsequent years. SMS was recognized as a methodology that could reportedly predict the likelihood of a risk event and proactively make adjustments, rather than taking the traditional reactive approach of primarily mitigating after an incident or accident investigation. As SMS became defined and formalized, other areas adapted the philosophy including the maritime industry, the railway industry and the aviation industry.

In the aviation industry, many or all features of SMS are already embedded within an airline's traditional quality management system (QMS) for airline operation. Federal Aviation Administration (FAA) and International Civil Aviation Organization (ICAO) define SMS risks as a measure of the expected losses that can be caused by an undesired event, factored with the probability of that event occurring, or R (Risk)=L (Likelihood)×S (Severity). Airline SMSs are designed to gather, assess, and disposition data to identify single points of failure that can propagate into systemic (aggregate) risks in the airline operating domain. Airlines use Task Cards (TC) to stipulate maintenance steps as defined and controlled by the quality system, that are performed in order for the aircraft Certificate of Airworthiness to remain current.

As a hypothetical example, an airline mechanic may complete and sign off a TC during maintenance of landing gear retraction hydraulic lines. However, the mechanic unintentionally overlooks the TC step that requires a hydraulic line fitting to be tightened to a specified torque value. As a result, low hydraulic fluid pressure causes landing gear retraction failure after takeoff, which in turn causes the aircraft to turn-back, which then results in a safety risk to passengers, as well as an economic airline risk in terms of passenger delays and compromised reputation. In the context of SMS:

R(1)=Safety risk to passengers
R(2)=Economic risk to airline
L=TC Likelihood/probability of single point failure (undesired event)
S=TC Severity of failure (systemic impact).

Comparable to airline maintenance task cards (TC), in the aircraft manufacturing domain the aircraft factory uses Installation Plans (IP). Manufacturing planners and quality engineers write IPs with process steps that mechanics accomplish to build aircraft. An IP error can be a single point of failure on the production line that can negatively manifest downstream in the production system, or once the airplane has left the factory and is in-service with the airline.

A similar quality management system is also implemented in the area of the aircraft maintenance, repair and overhaul (MRO) domain in the aviation industry. However, an integrated system of risk management throughout the whole lifetime of an aircraft including aircraft design & manufacturing, airline operations and aircraft maintenance & repair is yet to be implemented.

In 2007, a Boeing 737-800 of China Airlines caught fire and exploded after landing and taxiing to the gate area in Japan. A later investigation found that this accident and similar other accidents of the same aircraft model were caused by punctures on the slat track housing by the loose main slat track downstop assembly or a nut that came off from the assembly, which resulted in a fuel leak and a fire. It has been suggested that if the airline Safety Management System (SMS) methodology were applied to the aircraft production domain, such an accident could have been prevented.

There is much dialogue in the global aviation industry about the SMS and how it should be integrated across all domains of the industry including aircraft design, production, flight operations, overhaul and maintenance, suppliers, service providers, airports, and so forth. Recently regulators are seeking to implement SMS provided by International Civil Aviation Organization (ICAO) into the aircraft manufacturing and aircraft maintenance domains. So far, however, there is no single risk management system which integrates risk management in all stages of life of an aircraft in one streamlined platform.

Implementing the SMS methodology directly to other domains of aircraft industry has been proven difficult. This is because aircraft design and production domains are naturally focused on the quality control of the manufactured products according to the specification and the efficiency of making such products, rather than on managing the risk of injury and economic loss from accidents. As a result, there is less motivation for designers and manufacturing engineers to think proactively from the viewpoint of airline operation and aircraft maintenance domains.

Moreover, once the production is complete and the aircraft is in operation, designers and manufacturing engineers are detached from the airline operation and aircraft maintenance, so there is lack of communication among the risk management/maintenance groups in different domains.

In this situation, when an accident broke out, it often took months or years and a lot of resources to investigate and find out the ultimate cause of the accident. And it took even more time to implement the safety measures to prevent further accidents based on the findings from the investigation.

Therefore, there is a need for a system that integrates design defect elimination, production quality control, airline operation risk control, and aircraft maintenance in one stream for the purpose of risk management throughout the whole lifetime of an aircraft. There is also a need for a system that facilitates communication among different domains of aviation industry on a shared platform such that risk propagation through domains may be effectively suppressed and controlled. Moreover, there is a need for a system that enables risk management in real time proactively, effectively, and more economically.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

There currently exists a need in the industry for a system and method for integrated risk management that takes a holistic approach throughout the whole lifecycle of an industry covering including design, manufacturing, operation/service, and maintenance. In one embodiment, a method for closed-loop real-time lifecycle risk management provides the steps of identifying, assessing, reviewing and mitigating risks. Historically identified data stored in the databases are loaded. Additionally, one or more users are provided with questionnaires to be filled out. Based on the answers to the questionnaires, various factors contributing to determination of the risks of errors are calculated. Depending on whether a risk is assessed on the production level or service level, the risk may be classified differently as, for example, an acceptable risk, a tolerable risk, or an intolerable risk. If a risk is classified as an intolerable risk, the risk is notified to interested persons. The notification may contain suggestions for mitigating the risk.

In another embodiment, a user may use the integrated risk management system to systematically and accurately identify a root cause of an error. The user may start from the highest level of the lifecycle of a product and assess the risk of an error. Then the user narrows down the scope of an error by successively going down to lower production levels of the product.

In most embodiments of the present invention, assessment of risks of an error, identification of root cause of the error, notification to interested parties and mitigation of the risks are done in real time using remote devices connected to the system. The dashboard to which various users connect allows different levels of access to the information contained within the system to different users.

Other aspects and advantages of the invention will be apparent from the following description, drawings, and appended claims.

BRIEF DESCRIPTION OF DRAWINGS

The present invention will be described by way of exemplary embodiments, but not limitations, illustrated in the accompanying drawings in which like references denote similar elements, and in which:

FIG. 5A is an exemplary list of detectability (D) questions used to assess the D value of an error of a task in the design & manufacturing domain of aviation industry using the Analytics Cube of FIG. 4.

FIG. 5B is an exemplary list of occurrence (O) questions used to assess the O value of an error of a task in the design & manufacturing domain of aviation industry using the Analytics Cube of FIG. 4.

FIG. 5C is an exemplary table of severity (S) values of an error of a task in the design & manufacturing domain of aviation industry using the Analytics Cube of FIG. 4.

FIG. 11 is an exemplary program dashboard at the program level.

FIG. 12 is an exemplary commodity dashboard at the commodity level.

FIG. 13 is an exemplary sub-commodity dashboard at the sub-commodity level.

FIG. 14 is an exemplary task card dashboard at the task card level.

FIG. 16 is an exemplary dashboard displaying a task card questionnaire for a user to fill out to determine the detectability (D) value of a certain task.

DETAILED DESCRIPTION

Figure 1:
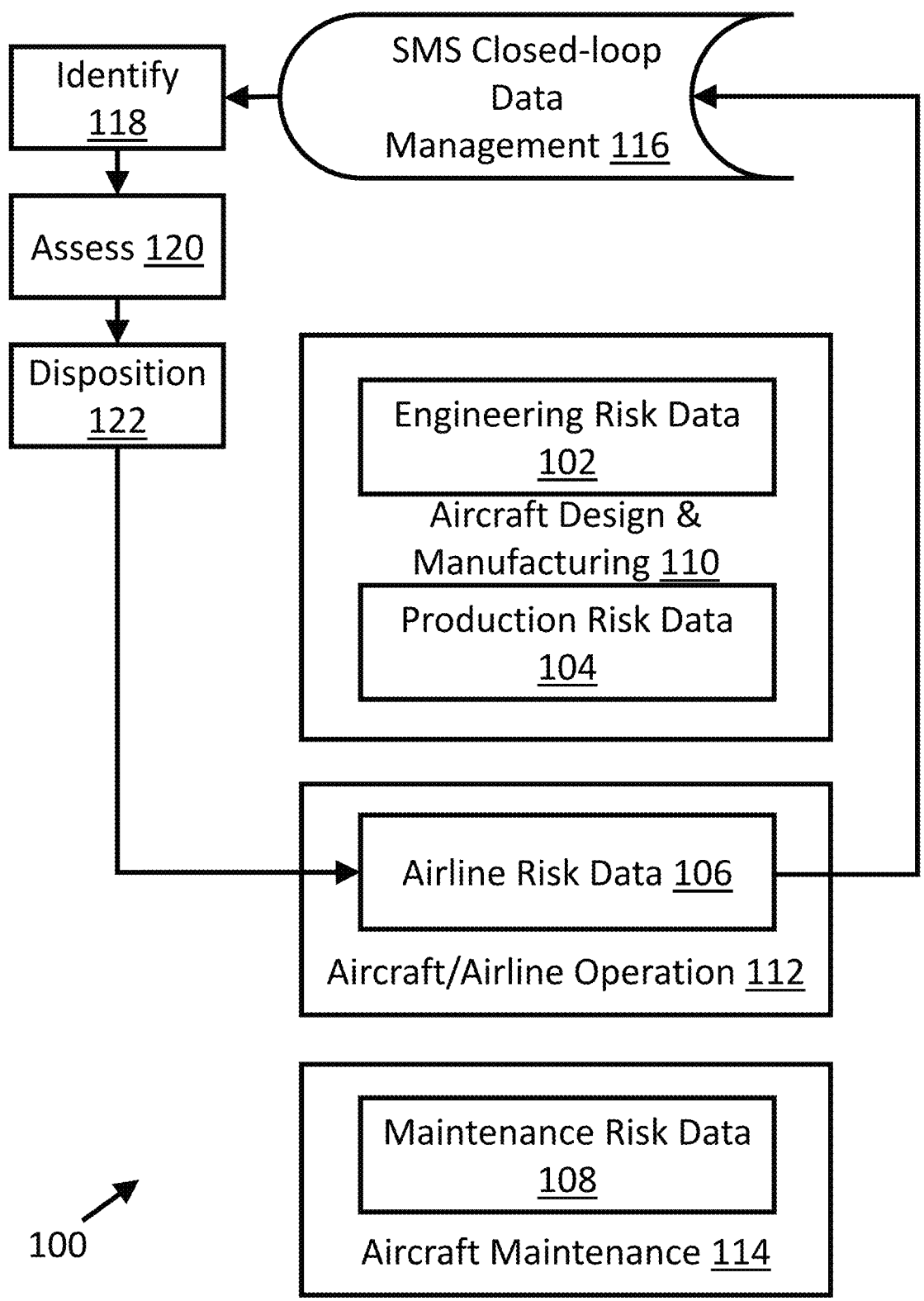
FIG. 1 is a prior art example of a diagram of a closed-loop safety management system (SMS) applied to airline operation domain.

In the Summary above and in this Detailed Description, and the claims below, and in the accompanying drawings, reference is made to particular features of the invention. It is to be understood that the disclosure of the invention in this specification includes all possible combinations of such particular features. For example, where a particular feature is disclosed in the context of a particular aspect or embodiment of the invention, or a particular claim, that feature can also be used—to the extent possible—in combination with and/or in the context of other particular aspects and embodiments of the invention, and in the invention generally.

The term "comprises" and grammatical equivalents thereof are used herein to mean that other components, ingredients, steps, etc. are optionally present. For example, an article "comprising" (or "which comprises") components A, B, and C can consist of (i.e., contain only) components A, B, and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range including that number (which may be a range having an upper limit or no upper limit, depending on the variable being defined). For example, "at least 1" means 1 or more than 1. The term "at most" followed by a number is used herein to denote the end of a range, including that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose limits include both numbers. For example, "25 to 100" means a range whose lower limit is 25, upper limit is 100, and includes both 25 and 100.

As a preface to the detailed description, it should be noted that, as used in this specification, the singular forms "a", "an", and "the" include plural referents, unless the context clearly dictates otherwise. Like reference numbers and designations in the various drawings indicate like elements.

The present description includes one or more embodiments that are generally related to a novel and helpful integrated system and method for risk management by proactively identifying and mitigating risks. Further, the present description includes one or more embodiments that include a platform that integrates product design defect elimination, production quality control, operation risk control, and maintenance control in one stream for the purpose of risk management throughout the whole lifetime of a product and the service using the product. Such a platform facilitates communication among the participants of the risk management working in different stages of the product and its use. Such a platform also allows proactive mitigation of risks in real time by analyzing, assessing, and subsequently correcting or suppressing the propagation of a risk in one domain to other domains of the industry throughout the lifetime of the product. More details are provided below with respect to the Figures. It must be emphasized that, although the present description takes many specific examples from the aviation industry, the present description is not limited to the aviation industry, but rather applicable to many different industries including but not limited to defense, automotive, maritime, healthcare, and pharmaceutical industries, each of which requires careful risk management throughout the lifecycle of their products in design, manufacturing, operation, and maintenance.

Referring to FIG. 1, a prior art example of safety management system (SMS) is shown applied to the airline operation domain, according to the International Civil Aviation Organization (ICAO) model. SMS in FIG. 1 defines a repeatable closed-loop data management process to proactively mitigate risks for airline operation 112 domain. First, airline risk data 106 is gathered by the SMS closed-loop data management system 116. The gathered data is identified 118, and the risk is assessed 120 using a risk tolerability matrix. The assessed risk is used to disposition 122 an appropriate mitigation action, resulting in altering the airline risk data. However, this closed-loop architecture only relates to the airline risk data 106 obtained and maintained in the airline operation 112 domain. Throughout the lifecycle of an airplane, aircraft manufacturing 110 designs, manufactures, conducts test flights, and delivers the airplane. Additionally, while the airplane is not in operation, an aircraft maintainer 114 performs various activities, such as parts & spares support, maintenance & modification services, flight safety training, and charting & navigation operation. To connect a closed-loop lifecycle data management architecture, additional links including aircraft design and manufacturing 110 and airplane maintainers 114 must be added to the existing SMS aircraft operator/airline data flow. This means providing an expanded closed-loop data management process incorporating engineering risk data 102 and production risk data 104 gathered from the aircraft design and manufacturing 110 domain, and maintenance risk data 108 gathered from the aircraft maintainer 114 domain.

The ICAO model uses the concept of tolerability matrix to measure risks. According to the tolerability matrix model, ICAO guidance defines SMS risk as a measure of the expected losses that can be caused by an undesired event, factored by the probability of that event occurring. In other words, if a point of failure is identified from the airline risk data 106, the risk (R) that propagates into airplane operation from that failure is calculated to be the likelihood (L) of a failure multiplied by the severity (S) of the failure.

Because there are multiple points of failures for airline risk management crew to check and maintain, airlines use Task Cards (TC) that stipulate maintenance steps defined and controlled by the quality system. Engineers and maintenance personnel fill out the TCs in order for the aircraft Certificate of Airworthiness to remain current.

Figure 2:
FIG. 2 is an example of a prior art risk assessment matrix used for the closed-loop SMS of FIG. 1.
Figure 3:
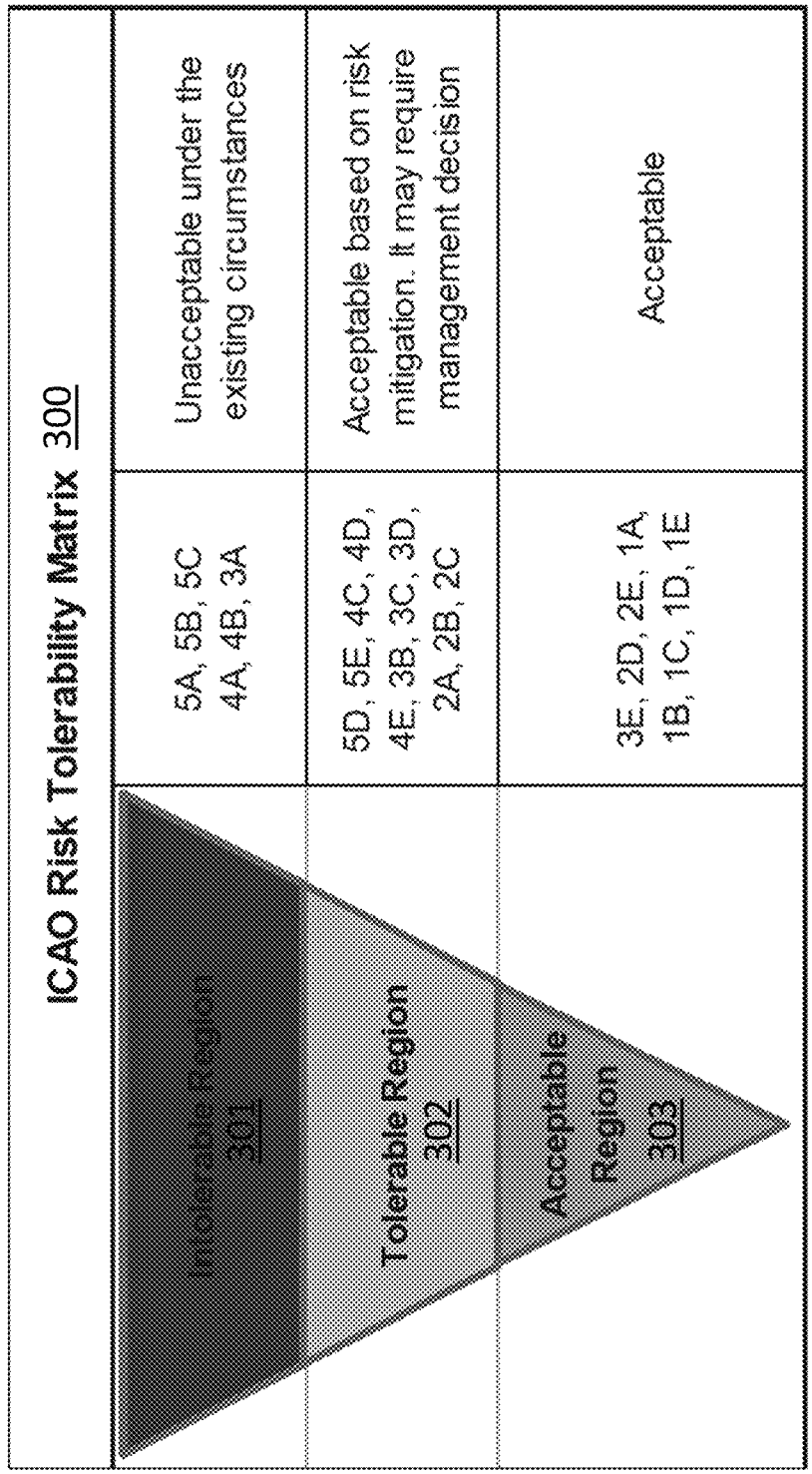
FIG. 3 is an example of a prior art risk tolerability matrix used for the closed-loop SMS of FIG. 1.

FIG. 2 is an example of a prior art risk assessment matrix 200. Every potential point of failure in a task card (TC) is given one of five values of likelihood (L) 202, from 1 to 5, and also given one of five levels of severity (S) 204, from A to E. For example, if a failure is improbable (2) likelihood of happening but its consequences are catastrophic (A), the risk (R) designation for this failure is 2A. In this example, there are total of 25 risk designations, and these are again classified into three groups of tolerability, as shown in FIG. 3, which is a prior art risk tolerability matrix 300. If a failure is classified as an intolerable risk 301, then the ICAO rules require for the risk management to mitigate the risk to reduce the risk down to either a tolerable 302 or acceptable risk 303.

Figure 4:
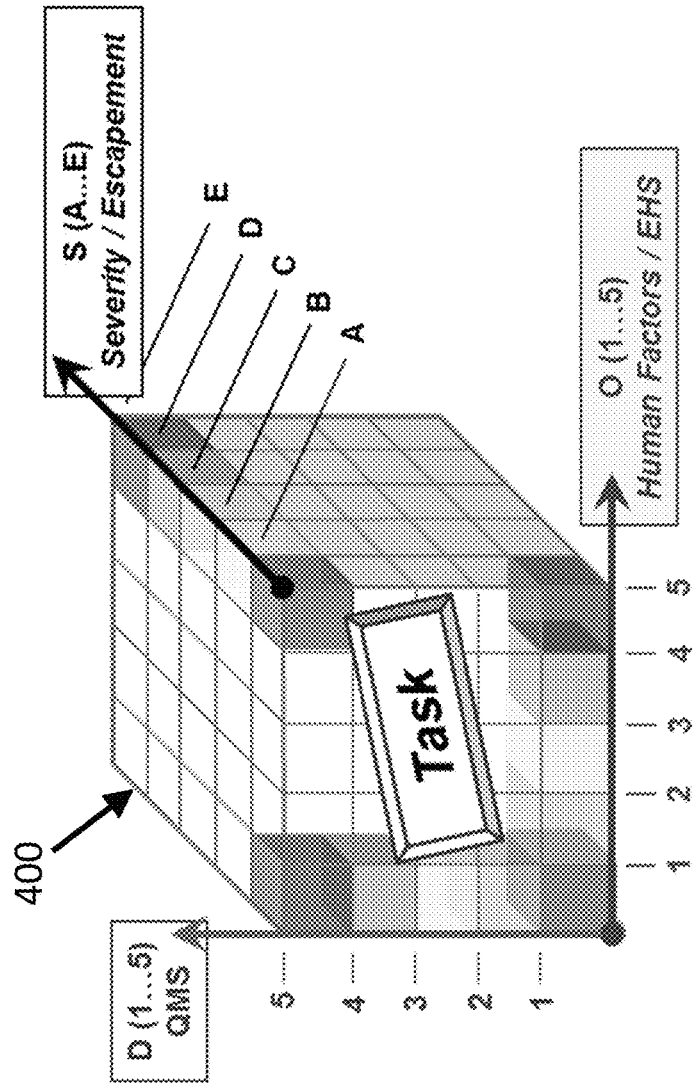
FIG. 4 is an exemplary embodiment of an Analytics Cube.

Referring to FIG. 4, an exemplary embodiment of an Analytics Cube (Cube) 400 is shown. The Cube 400 expands and goes beyond the ICAO model of SMS applied to airline operation domain, and it is applicable across all domains of the industry. For example, one can examine the degrees of risks in various subparts, called "commodities," that comprise a specific aircraft. A "commodity" may refer to a module or a subsystem that makes up an aircraft. One can also examine the degree of risk of a specific commodity or sub-commodity that is common in multiple models, or "programs," of aircraft. The commodity or sub-commodity may be further dissected by examining the risks of specific parts or manufacturing processes. In this way, it is possible to systematically and easily identify the root cause of many risks manifested in sub-commodities, commodities, and aircrafts in real time or near real time. This versatile applicability of the Cube 400 to many different intermediate stages of the end-product will be further explained in more detail below with FIGS. 10-16.

Referring back to FIG. 4, the Cube 400 is an algorithm that automatically quantifies the likelihood of an error as a function of human factors and the associated quality management system (QMS) implemented in the domain. Similar to the ICAO model, the risk (R) that an error occurs in a task in any domain is calculated to be the likelihood (L) of generating a risk multiplied by the severity (S) of the error.

Next, the L value is calculated by assessing the detectability (D) of the error multiplied by the occurrence (O) of the error. D depends on the QMS implemented in the domain. In other words, the error of a task may be more easily detectable depending on the specific QMS implemented in the domain, and the error of a different task may be less easily detectable. O is a function of human factors (HF). A human working on a task may be a design engineer or manufacturing worker in the aircraft design and manufacturing 110 domain, an airline operation personnel in the airline operation 112 domain, or a maintenance engineer in the airline maintainer 114 domain. Depending on the complexity and/or difficulty of a specific task, the human working on the task may be more prone, or less prone, to commit an error.

FIGS. 5A-5C show an example of assessing the likelihood (L) of an error of a task in the design & manufacturing 110 domain of aviation industry. Referring to FIG. 5A, in one embodiment, a detectability (D) of an error of an installation plan (IP) is determined by loading the data previously obtained from the quality maintenance system (QMS). Alternatively, in another embodiment, the D value of an error is determined by creating relevant questionnaire and answering it by checking Yes or No to each question. The questionnaire includes multiple questions specific to the error to be investigated. Depending on the error to be assessed, there may be a different number of questions. Each question relates to a mechanism or process by which the error may possibly be detected. For example, in FIG. 5A, there are nine questions, including: whether the error will prevent subsequent process such that the error will become apparent (Q1); whether a surveillance plan exists (Q2); whether concurrent inspectors exist (Q3); and whether there is an end-item sampling inspection step (Q4). The number of Yes's and No's to these questions are collected to calculate the D value. In other words, out of these possible mechanisms or processes, the percentage of mechanisms or processes that are actually implemented is calculated, and from this percentage the D value is determined. The higher the percentage, the lower the D value becomes. As described above, the assessment of D values may alternatively be directly loaded from the QMS data.

Referring to FIG. 5B, in one embodiment, an occurrence (O) of an error is determined by a manufacturing worker or mechanic who fills in the questionnaire of an installation plan (IP) by checking Yes or No to each question. Each question relates to how difficult or easy it is for a manufacturing worker to commit the error. For example, in FIG. 5B, questions include: whether a mechanic will likely find it difficult to use a tool in a given situation (Q5); whether the design or installation related to the error is complex (Q6); and whether a special training is required to conduct the installation (Q9). As in the case for D values, the number of Yes's and No's are collected to determine the O value.

Referring to FIG. 5C, similar to FIG. 5A, a severity (S) value may be obtained either by loading the QMS data or by creating relevant questionnaire and answering it. Whereas the conventional S value limited to airline operation domain shown in the prior art of FIG. 2 assesses the degree of the damages of an error, the S value of the integrated risk management system assesses "escapement," that is, how far the error propagates in the lifecycle of an airplane before the error is discovered. For example, if an error could be discoverable in immediate production line 502, the S value is "E". If an error could be discoverable during pre-flight 506, the S value is "C". As the escapement is more "external," that is, if the earliest place that an error is likely to be found is at a later stage of the production or maintenance, it poses a higher severity of risk. For example, an error that is likely to be found only after the aircraft is put into airline operation poses a higher severity of risk than an error that is likely to be found at the commodity assembly level.

Whether an error is an external or internal escapement depends on the level in the airplane lifecycle in which the risk is assessed. For example, when a user surveys risks on the level of a specific airplane, an error that is likely to be found for the first time in a fuel system, which is one of many commodities inside aircraft, is an internal escapement. But when a user surveys risks on distribution-drain valves, which is one of the sub-commodities of the fuel system, the same error that is likely to be found in a fuel system level is an external escapement. Knowing this, identifying the root cause of an error can be made much easier, faster and more efficient, which will be explained in more detail below with FIGS. 10-16.

When the D and O values are combined with the S value, ultimately the risk (R) value is assessed. The assessment of an R value and the consequent assessment of its risk tolerability will be conducted using a similar method as in the prior art risk assessment matrix 200 and the risk tolerability matrix 300 of FIGS. 2-3. As shown above in the discussion of S values, the risk tolerability of an error at each level will be different, because at each level the degree of escapement is different. This will be explained in more detail below with FIGS. 10-16. Although FIGS. 5A-5C only show an example in the design & manufacturing 110 domain, it is important to note that this disclosure is applicable to any domain of any industry requiring careful risk management throughout the lifecycle of their products in design, manufacturing, operation, and maintenance.

In some cases, an actual or potential risk is identified from the historic data gathered from the engineering risk data 102, production risk data 104, airline risk data 106, and maintenance risk data 108 and pre-loaded in the form of installation plan (IP), task card (TC), or work instruction (WI). In other cases, a risk previously unidentified is newly identified and loaded to the system for assessment through the process similar to the one shown in FIGS. 5A-5C.

Figure 6A:
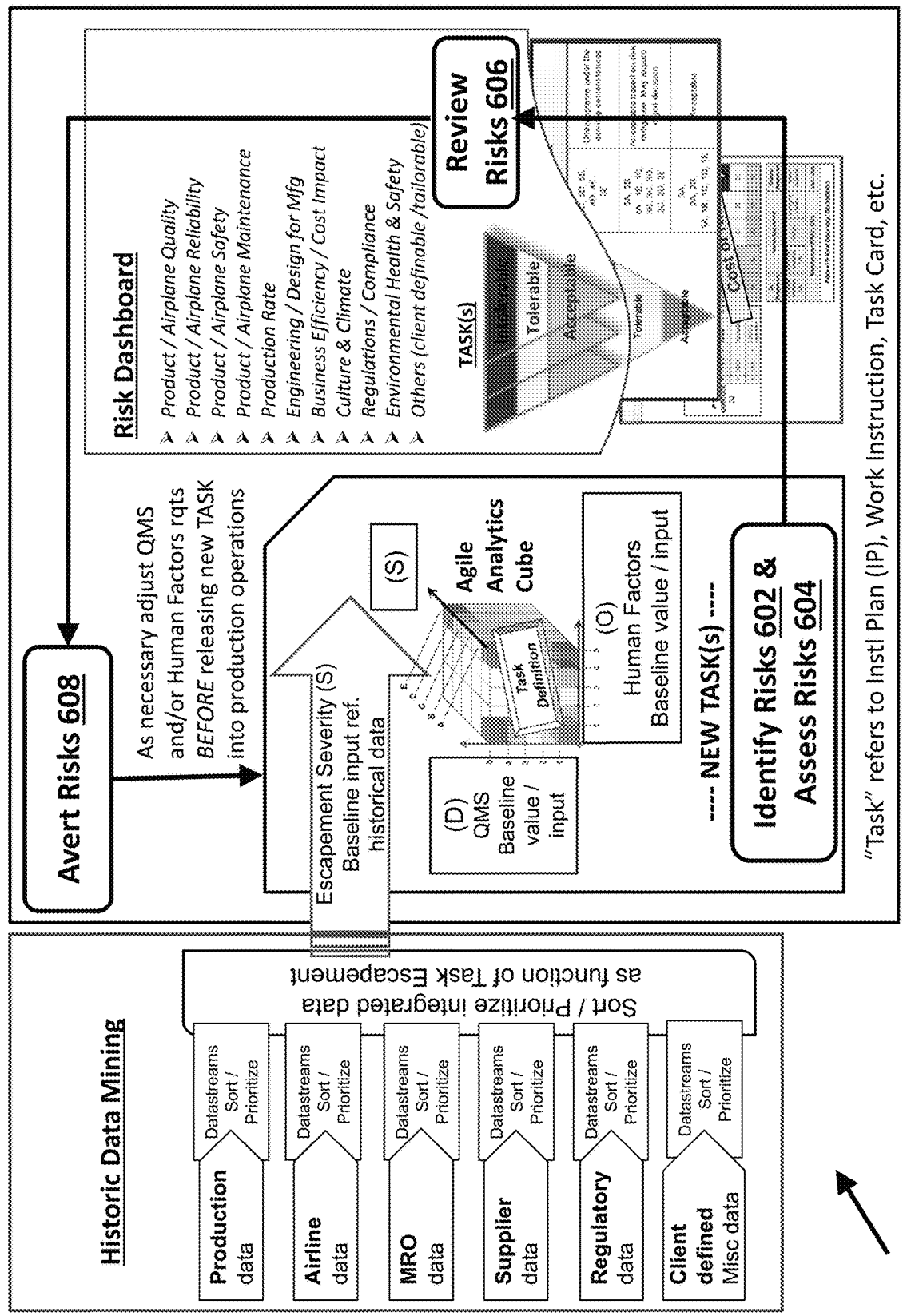
FIG. 6A is a diagram of an exemplary embodiment of a closed-loop real-time lifecycle risk management process applied to aviation industry.

FIG. 6A is a diagram 600 of an embodiment of a closed-loop, real-time risk management process applied to aviation industry. In this closed-loop process, risks are identified 602 creating new "Tasks," such as installation plans (IP), task cards (TC), and work instructions (WI), to be filled out by design engineers, production engineers, maintenance engineers, and other risk management personnel. Next, the identified risks are assessed 604 by calculating the key performance indicators (KPI) using the Analytics Cube (Cube) 400 discussed above.

Next, the calculated KPIs are reviewed 606 by making risk tolerability matrices and then identifying the domains and their interested parties to which the risk tolerability matrices are applicable. As discussed above, the KPI may be categorized as intolerable, tolerable, or acceptable within a risk tolerability matrix. For example, a specific risk may be an acceptable risk for production engineers working in the aircraft design and manufacturing 110 domain, but it may be a tolerable risk for safety training and education personnel working in the airline operation 112 domain, and an intolerable risk for risk management executives working in the airline operation 112 domain. In this risk review 606 stage, different levels of access and control of a specific risk are assigned to different interested parties. For each risk tolerability matrix, an intolerable or tolerable risk may trigger a proactive action to avert risks 608 as described below.

Next, predictive and/or proactive actions to avert risks 608 are taken. In this stage, the traditional quality management system (QMS) in each domain is adjusted, and human factors (HF) requirements are also adjusted before releasing new Tasks to interested parties. With new Tasks, the cycle of identifying risks 602, assessing risks 604, reviewing risks 606 and averting risks 608 is repeated in real-time.

Figure 6B:
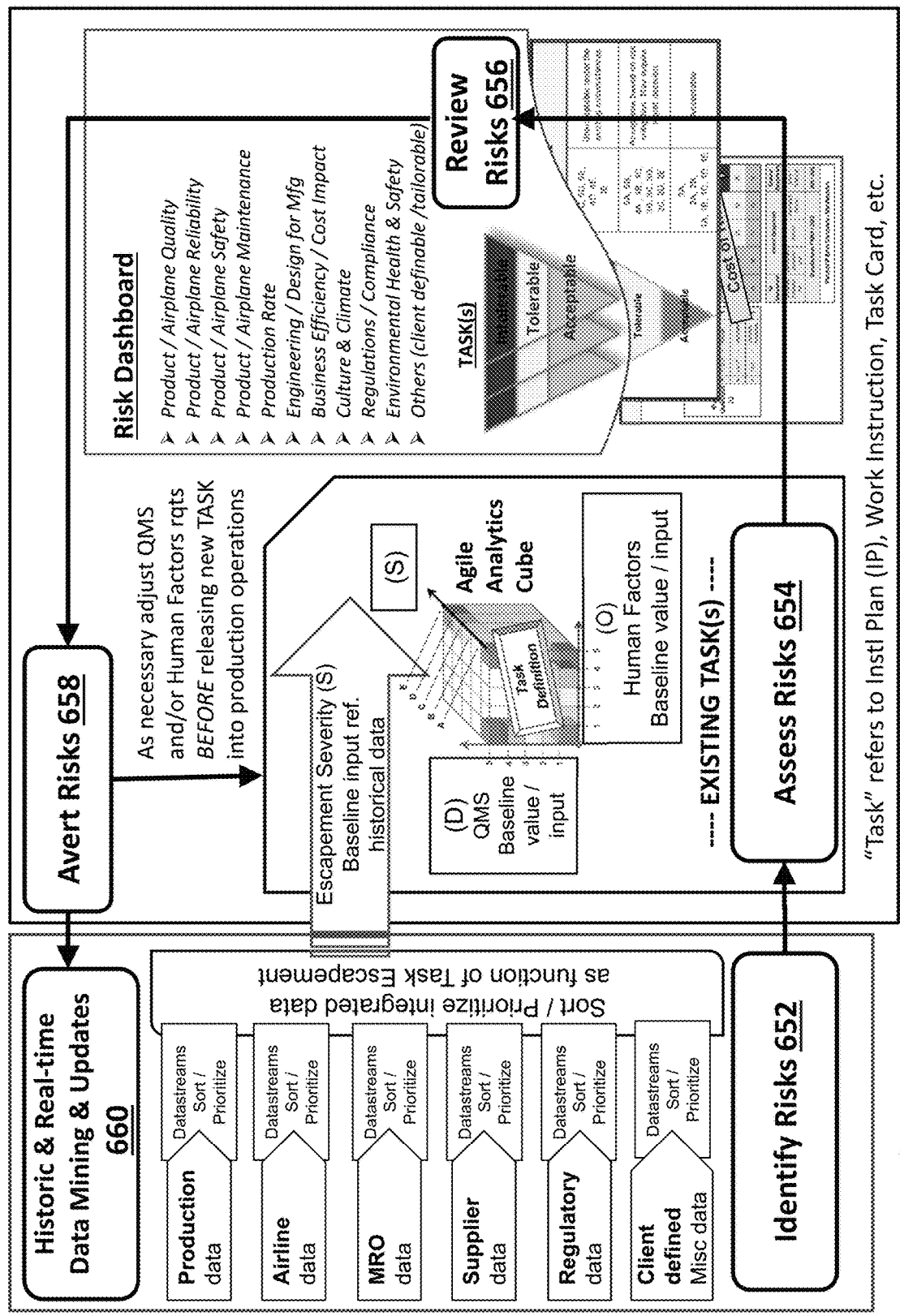
FIG. 6B is a diagram of an exemplary embodiment of a closed-loop real-time lifecycle risk management process similar to the process of FIG. 6A.

FIG. 6B is a diagram 650 of an embodiment of a closed-loop real-time lifecycle risk management process similar to the process of FIG. 6A. In this closed-loop process, risks are identified 652 by loading data from the existing Tasks of various domains through historic data mining. Next, the identified risks are assessed 654 by calculating the risk using the Cube 400. Next, the calculated risks are then reviewed 656 in the same way as in FIG. 6A. Next, predictive and/or proactive actions to avert risks 658 are taken by adjusting the traditional QMS in the domains, adjusting the HF requirements, and updating 660 the existing Tasks and the data related to the Tasks.

Figure 7:
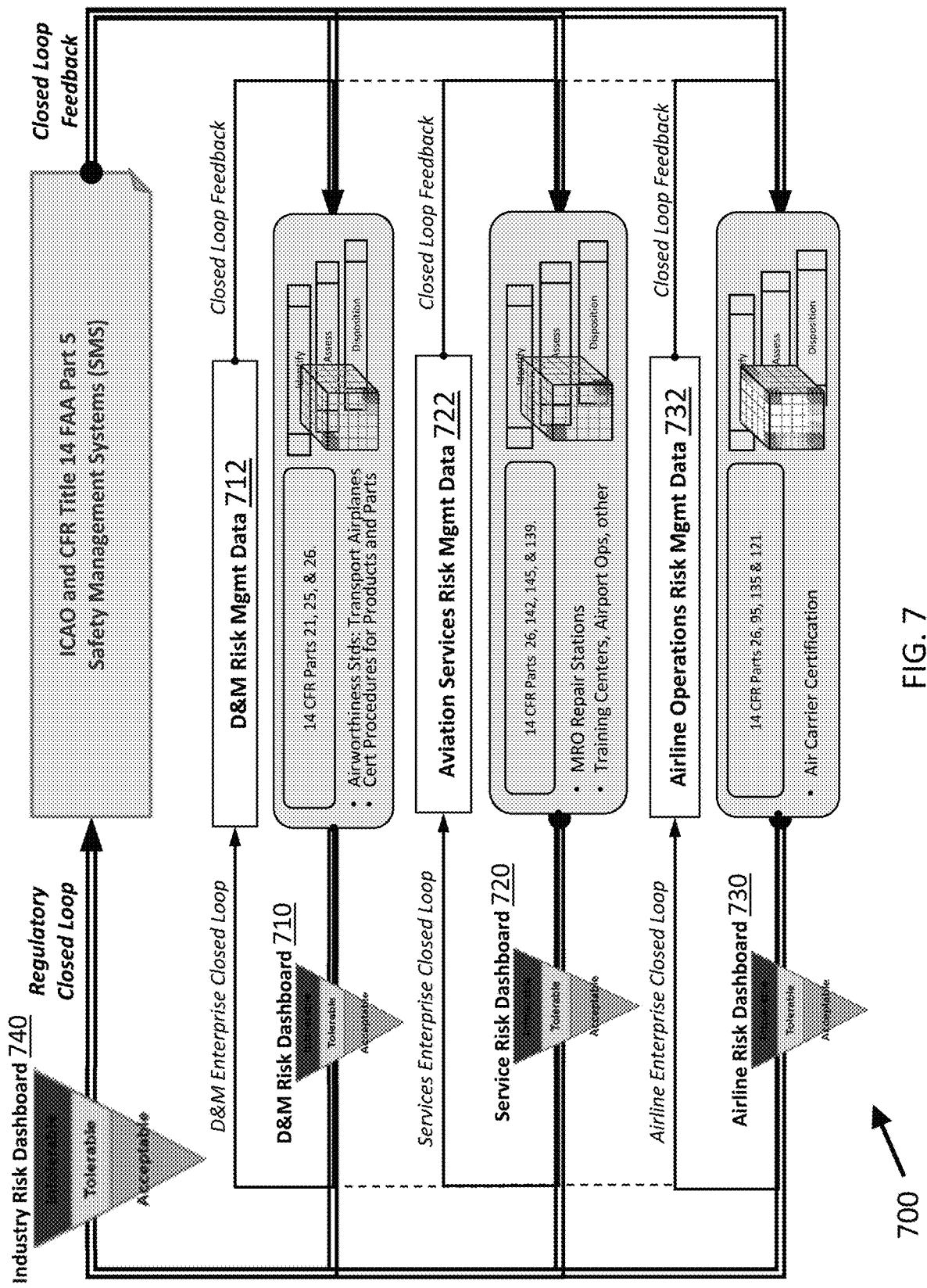
FIG. 7 is a diagram of an exemplary embodiment of a closed-loop real-time lifecycle risk management process of FIGS. 6A-6B seen from the perspective of compliance with laws and regulations required on different domains.

Referring to FIG. 7, a diagram 700 is shown for an embodiment of a closed-loop real-time lifecycle risk management process, seen from the perspective of compliance with laws and regulations required on different domains. Different laws and regulations apply for risk management in different domains of the industry. For example, in the United States, under the federal law 14 C.F.R. Parts 21, 25 and 26 govern the aircraft design and manufacturing 110 domain. The diagram 700 shows how the closed-loop real-time lifecycle risk management is done in both large and small scales. For example, in the aircraft design and manufacturing 110 domain, as exemplified in FIG. 6B, risks are identified 652, assessed 654, and reviewed 656 on design & manufacturing risk dashboard 710, and the risks are averted 658 by adjusting the design & manufacturing management data 712 such that the risk management within the design and manufacturing 110 domain remains compliant with the laws and regulations. For another example, in the aircraft/aviation operation 112 domain, risks are identified 652, assessed 654, and reviewed 656 on airline risk dashboard 730, and the risks are averted 658 by adjusting the airline operations risk management data 732 such that the risk management within the aircraft/aviation operation 112 domain remains compliant with the laws and regulations, for example 14 C.F.R. Parts 26, 95, 135 and 121. A similar kind of risk management feedback loops are formed in the rest of the domains.

Moreover, an industry risk dashboard 740 enables a holistic feedback loop of risk management for the whole lifecycle of the aviation industry or any other industry to which the present invention is applicable. For example, a risk arising from the design and manufacturing 110 domain may have an impact on the aircraft maintenance 114 domain, and an interested party who has access to the industry risk dashboard 740 may be able to see the impact. If the interested party, for example a manufacturing engineer in the design and manufacturing 110 domain, also has control over the design & manufacturing dashboard 710, she may take an action to avert risk 658 that originates from her own domain, i.e. the design and manufacturing 110 domain, but impacts other domains, so that an industry-wide, integrated, real-time risk management is possible.

Figure 8:
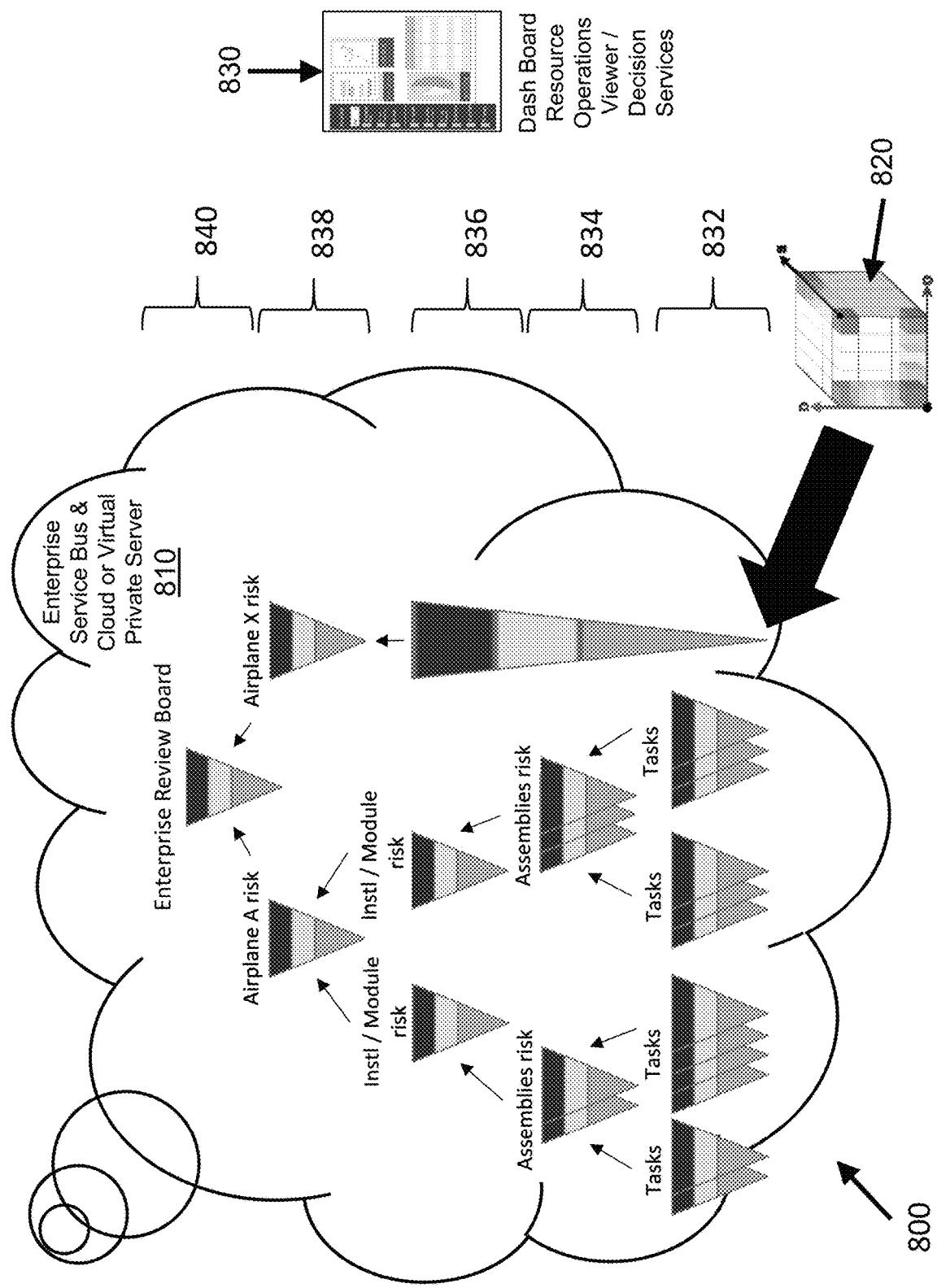
FIG. 8 is a diagram of an exemplary embodiment of a system for risk management tailored to a client in the airplane design and manufacturing domain of aviation industry.

Referring to FIG. 8, a diagram 800 is shown for an exemplary embodiment of a system 810 for risk management tailored to a client in the airplane design and manufacturing 110 domain. The system 810 may be implemented on a cloud server or virtual private server using the techniques known to a person having ordinary skill in the art. In one example, the system 810 has memory storage which stores programs running risk management algorithm as discussed herein and various data including the historical data obtained from different domains of the industry. The system 810 also has a microprocessor equipped to carry out various calculations according to the algorithm stored in the memory storage. Interested parties, or users, may connect to the system 810 using various devices including desktop computers, laptop computers, tablet computers, or other mobile devices including smartphones. Using the risks identified and assessed from historic data and the Tasks as described in FIGS. 6A-6B, Analysis Cubes 820 implemented in the system 810 automatically calculate risk tolerability matrices 832, 834, 836, 838, 840 in various stages of aircraft design and manufacturing.

Many interested parties in different stages may be given different levels of rights to access and/or control the risk tolerability matrices 832, 834, 836, 838, and 840. As a result, depending on their access and control levels, different dashboards 830 are provided to different interested parties, or users, of the system 810. Through these dashboards 830 the interested parties or users, can access production risk information in real time and take proactive risk mitigation actions. It is important to note that the risk tolerability matrices 832, 834, 836, 838, and 840 in FIG. 8 are shown only for illustrative purposes, and the system 810 may have risk tolerability matrices in as many stages or levels as required by the pertinent industry.

Figure 9:
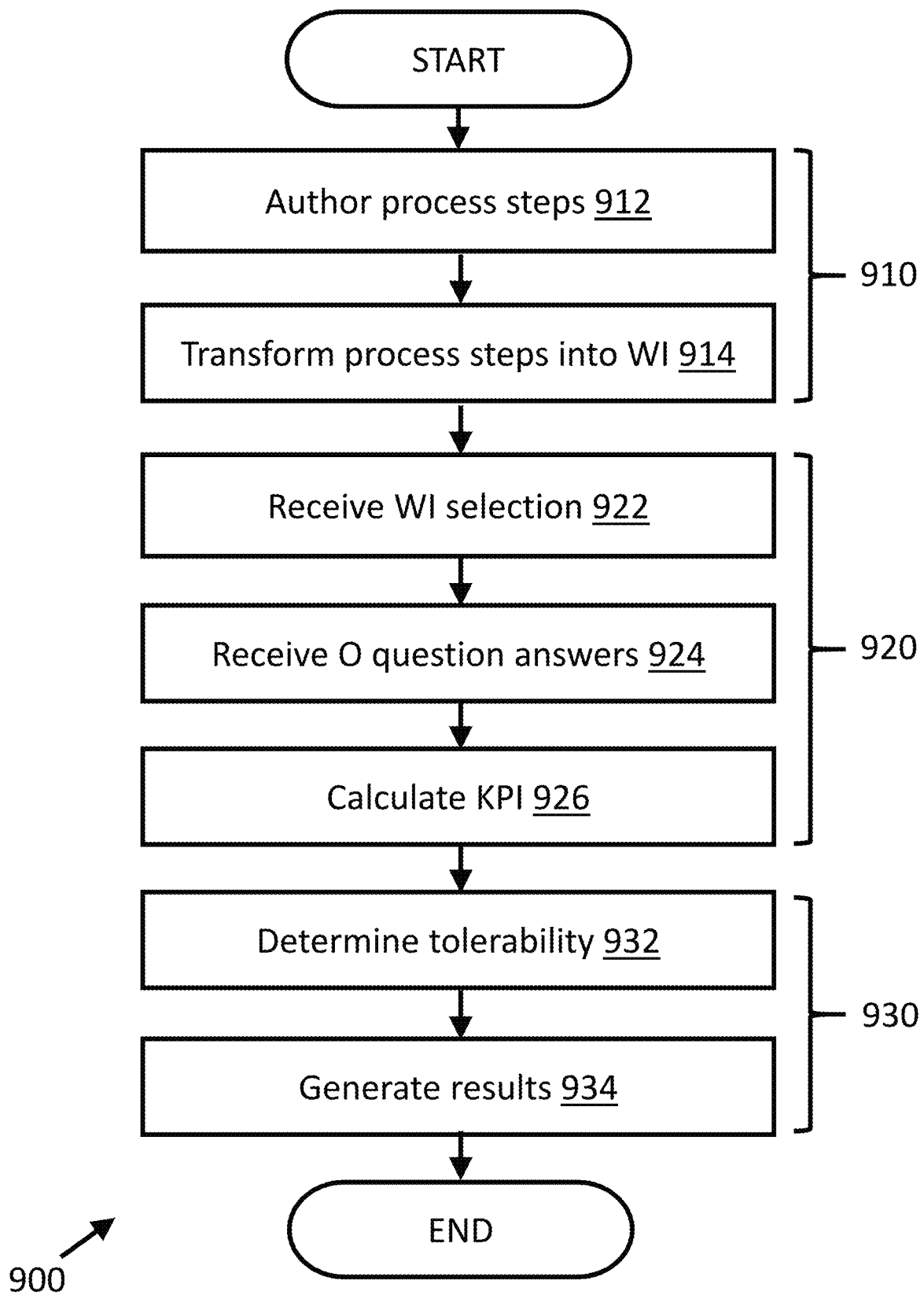
FIG. 9 is a flowchart describing an exemplary work procedure utilizing the system of FIG. 8.

Referring to FIG. 9, a flowchart 900 is shown describing an exemplary work procedure utilizing the system 810 of FIG. 8 for use in the design and manufacturing 110 domain. First, work instructions (WI) are authored 910. More specifically, in Step 912, a manufacturing engineer authors the process steps. Next, in Step 914, the system 810 transforms the process steps into executable work instructions (WI), into which the Detectability (D) and the Severity (S) values are loaded, along with the Occurrence (O) questions.

Next, the WI are executed 920. More specifically, in Step 922, a mechanic logs into the system 810 and selects the WI. Next, in Step 924, the mechanic answers the Occurrence (O) questions in the selected WI. Next, in Step 926, a key performance indicator (KPI) associated with the WI is calculated based on the D, O, and S values.

Next, the production risk is managed 930. More specifically, in Step 932, the KPI calculated in Step 926 is scaled in risk tolerability matrices into one of "intolerable," "tolerable," and "acceptable" categories and stored in the memory of the system 800. There may be many different risk tolerability matrices associated with the WI in different hierarchies, such as the risk tolerability matrices 832, 834, 836, 838, 840 of FIG. 8. In Step 934, the system 810 provides real-time results of the tolerability of the risk obtained from Step 932. The results may be visible to a user logging on the system 810 later, depending on the person's level of access and control of information. Alternatively, the system 810 may notify a group of interested parties with respect to the specific risk. The notification may be conducted by sending emails, showing a pop-up notification window whenever an interested party logs into the system 810, or using any other method known to a person having ordinary skill in the art. In this way, the present invention allows for predictive identification and proactive mitigation of risks in real time without requiring additional personnel dedicated to risk management.

Referring to FIGS. 10-15, a user interface is shown for an exemplary embodiment of different dashboards 830 connected to the system 810 of FIG. 8 to illustrate how a user may be able to identify the root cause of an error utilizing various dashboards similar to those shown in FIG. 7, such as industry risk dashboard 740, design & manufacturing risk dashboard 710, service risk dashboard 720, and airline risk dashboard 730.

Figure 10:
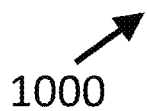
FIG. 10 is an exemplary list of views a user can choose on a dashboard.

A user can view and assess risks of different stages or levels in the lifecycle of an airplane. FIG. 10 is a list of views 1000 a user can choose on a user-interface, or dashboard. For example, a user may view the risk map of all the airplanes produced by an airplane manufacturing company 1010, such as The Boeing Company, on a single dashboard. Or a user may view the risk map of all the aircraft models, called "programs" 1030, produced within a certain division 1020 or group within the company, such as the Boeing Commercial Airplanes (BCA) or the Boeing Defense, Space, & Security (BDS) division. For example, in the BCA division, there are various programs including the 737 Max and the 787. Each 737 Max aircraft has a serial number or ID number 1040. Further, each 737 Max aircraft comprises many "commodities" 1050, which are sub-systems that make up an aircraft, including a fuel system. And each commodity comprises many sub-commodities 1060. For example, a fuel system comprises general, storage, distribution-drain valves, dump, and indicating sub-commodities. For each sub-commodity 1060, various tasks 1070 are assigned to engineers and maintenance crew working in different domains of the aircraft industry, and their corresponding task cards may be issued to them. It is important to note that the levels described above are only exemplary, and the risk management system described above may be applicable to situations with many different levels of production and different industries.

Referring to FIGS. 11-15, an exemplary process whereby a user identifies the root cause of an error is shown. FIG. 11 shows an exemplary program dashboard 1100 at the program level. The exemplary program shown here is the 737 Max program. The program dashboard 1100 shows in a table form many 737 Max airplanes having different serial numbers, ID numbers, ranging from 001 to 200. The list shows currently the production of 175 out of 200 737 Max airplanes is complete. Among the 175 completed airplanes, eight airplanes, such as aircraft IDs 63, 123, 139 and 140, are revealed to have tolerable risks assessed using the risk tolerability matrix. Additionally, aircraft ID 146 (1110) is found to have an intolerable risk. All the rest aircrafts have acceptable risks.

In order to further investigate the intolerable risk found in aircraft ID 146, a user may switch to a lower level. FIG. 12 shows an exemplary commodity dashboard 1200 at the commodity level. Many different commodities are used and assembled into a 737 Max model aircraft. In aircraft ID 146 (1110), commodities 26, 27 and 29 are found to have tolerable risks. Additionally, commodity 28 (1210), a fuel system, is found to have an intolerable risk, which makes the aircraft ID 146 (1110) contain an intolerable risk.

In order to still further investigate the intolerable risk found in the fuel system commodity, a user may switch to a lower level. FIG. 13 shows an exemplary sub-commodity dashboard 1300 at the sub-commodity level. Many different sub-commodities are used and assembled into a fuel system that goes into a 737 Max model aircraft. For the aircraft ID 146 (1100), the commodity 28 fuel system 1210 has sub-commodities, for example general 1310, storage 1320, distribution-drain valves 1330, dump 1340, and indicating 1350. In this exemplary sub-commodity dashboard 1300, the storage 1320 is found to have an intolerable risk.

In order to figure out what needs to be done to mitigate the identified intolerable risk, a user may go still further down to a lower level. FIG. 14 shows an exemplary task card dashboard 1400 at the task card level. Manufacturing and/or maintaining a storage 1320 for a fuel system 1210 may involve one or more tasks for which one or more engineer or maintenance crew will fill out corresponding task cards. For example, the task card dashboard 1400 shows thirty tasks or task cards, and the task card ID 13 is found to have an intolerable risk. In this way, the root cause of an intolerable risk can be identified.

When the root cause of an intolerable risk is identified, a user may fix the problem in the task on-site and update the task card. Or a user may report the risk to other personnel so that those who are in a more adequate position to resolve the issue may be notified.

Figure 15:
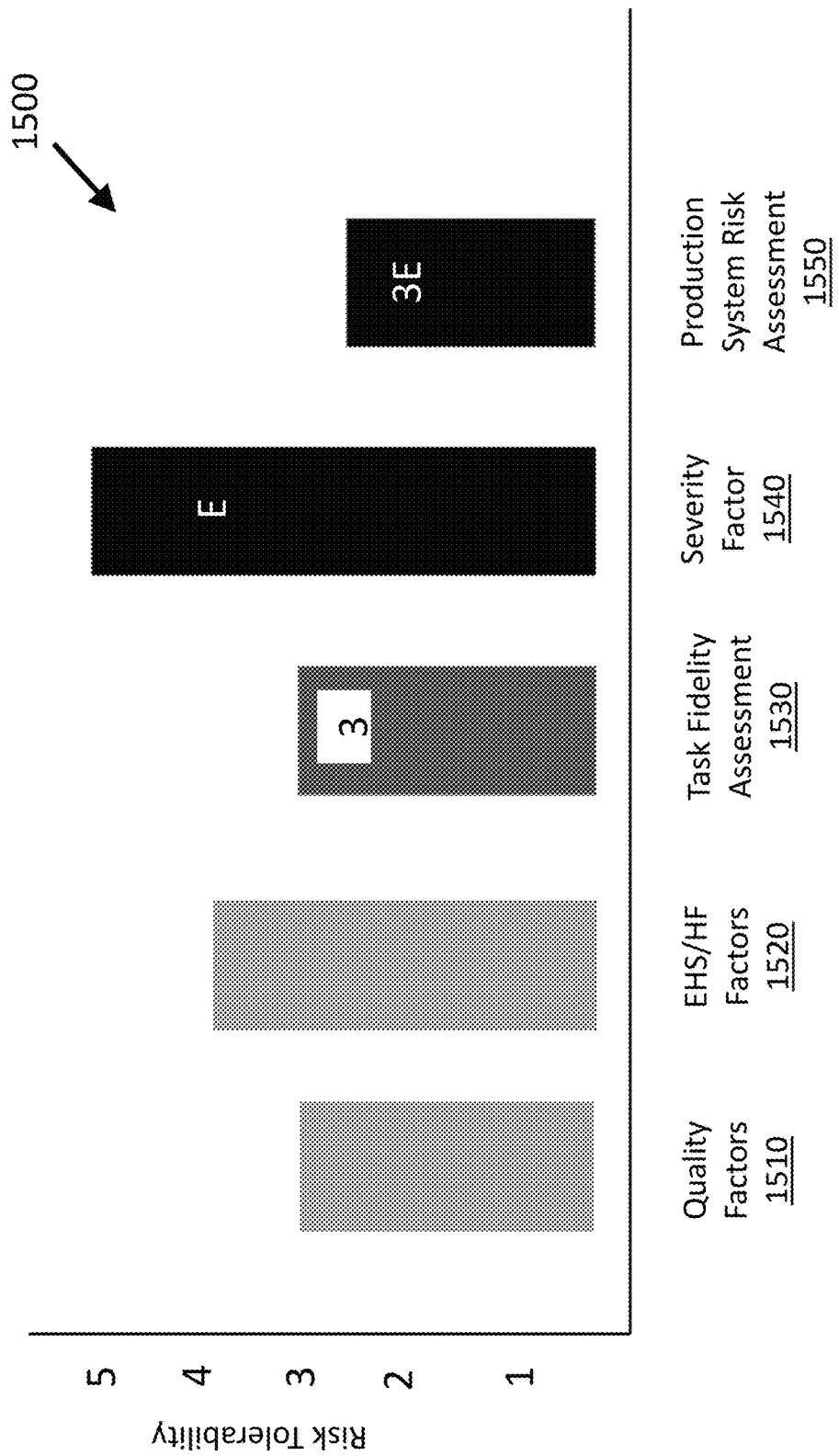
FIG. 15 is an exemplary diagram showing the factors contributing to making a certain task an intolerable risk.

When the risk is assessed at the task card level using the Analytics Cube 400, the biggest factor contributing to making a certain task an intolerable risk may be a quality control issue 1510, an environmental health & safety (EHS) and/or human factor (HF) issue 1520, a "task fidelity" issue 1530 (an issue related to how the complexity of a task affects the fidelity of work performance), or severity factor issue 1540. FIG. 15 illustrates an example. In this example, the quality issue 1510, EHS and HF issues 1520 is low, but the task fidelity issue 1530 is at a medium level, and the severity factor 1540 is high. As a result, the overall production system risk 1550 is assessed to be intolerable. In this case, for example, a user may attempt to reduce the task fidelity by altering the task. Or a design engineer may be notified to design an alternative commodity or sub-commodity that has lower severity factor. In this way, the intolerable risk may be mitigated to either a tolerable risk or an acceptable risk, or the risk may be completely eliminated.

While the exemplary process described above has five levels of dashboards, it is important to note that the number of levels of dashboards is only exemplary, and there can be any number of levels of dashboards as necessary to implement effective and efficient risk management in the pertinent industry. It is also important to note that different users may be allowed different levels of access to various dashboards. For example, a production engineer at an airplane manufacturing company working on a specific section of the manufacturing process may only be given access to a sub-commodity dashboard of his or her section, such as the sub-commodity dashboard 1300 shown in FIG. 13. An executive of the airplane manufacturing company may be given full access to view the dashboards of all levels but not the right to alter the task cards. These different access rights may be adjusted and controlled by the system 810.

Figure 16:
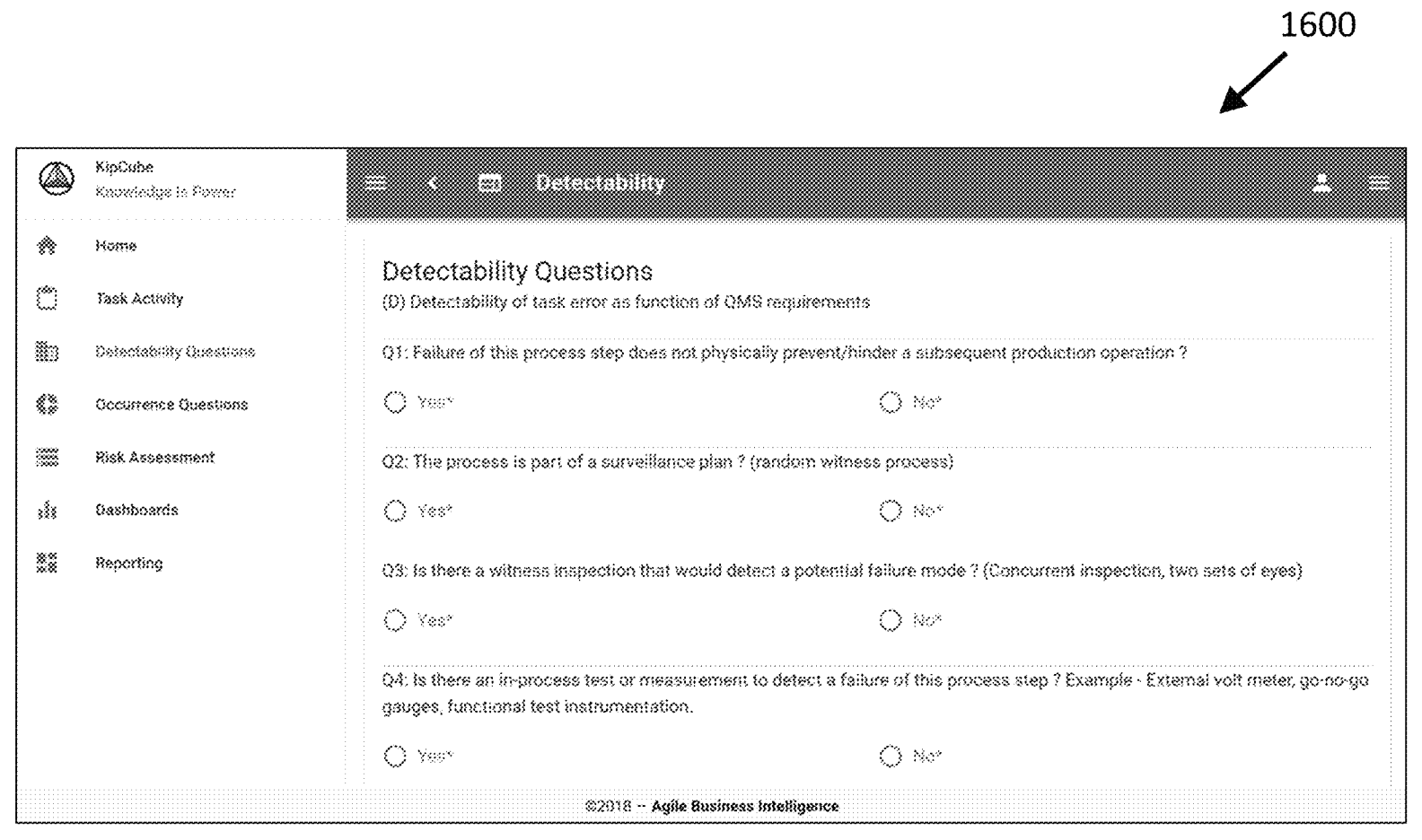

The system 810 and the dashboards 830 are accessible from multiple platforms including but not limited to smart-phones, tablet computers, laptop computers, and other mobile devices, desktop computers, and remote terminals. Depending on users, the system 810 may grant different levels and degrees of access to various information and rights. The dashboards may not only display to users risk assessment results on various levels, but they may also provide users with other channels of communication such as a login prompt, task card questionnaires, reporting tools, and analysis tools. FIG. 16 shows an exemplary dashboard displaying a task card questionnaire for a user to fill out to determine the detectability (D) value of a certain task.

While certain exemplary embodiments have been described and shown in the accompanying drawings, it is to be understood that such embodiments are merely illustrative of and not restrictive on the broad application, and that this application is not limited to the specific constructions and arrangements shown and described, because various other modifications within the spirit of the present invention may occur to those of ordinary skill in the art.

What is claimed is:
1. A method for integrated risk management, the method comprising the steps of:
receiving, by a computer device, historically identified risk data from a plurality of business domain databases, wherein the plurality of business domain databases comprise a manufacturing domain database, an operation domain database, and a maintenance domain database;

identifying, by the computer device, one or more errors from the historically identified risk data, wherein for each of the one or more errors the historically identified risk data comprises:
 a detectability value,
 one or more detectability questions corresponding to the detectability value,
 an answer to each of the one or more detectability questions,
 an occurrence value, and
 a severity value;

calculating, by the computer device, for each of the one or more errors the detectability value from the answers corresponding to the one or more detectability questions;

generating, by the computer device, for each of the one or more errors one or more occurrence questions corresponding to the occurrence value based on the historically identified risk data;

receiving, by the computer device, an answer for each of the one or more occurrence questions from one or more users;

calculating, by the computer device, for each of the one or more errors the occurrence value from the answers corresponding to the one or more occurrence questions;

calculating, by the computer device, for each of the one or more errors a key performance index, wherein the key performance index is calculated from the detectability value, the occurrence value, and the severity value;

providing, by the computer device, a plurality of view levels in a hierarchical relationship with one another defined by at least one upper view level and at least one lower view level, wherein
 each of the view levels is associated with one or more risk tolerability matrices, and
 one of the one or more risk tolerability matrices of one of the lower view levels contributes to the determination of at least one of the one or more risk tolerability matrices of one of the upper view levels;

displaying, by the computer device, a view level subgroup comprising at least one view level subgroup member selected by the one or more users from the one or more view levels, wherein
 each view level subgroup member includes at least one or more subgroup errors, each of the one or more subgroup errors includes one or more intolerable risks, wherein the intolerable risks are highlighted on at least one view level dashboard; and
 the one or more risk tolerability matrices for one of the one or more subgroup errors of a lower view level subgroup member contributes to the determination of one of the one or more risk tolerability matrices for one of the one or more subgroup errors of its upper view level subgroup member;

receiving, by the computer device, the one or more intolerable risks of the one of the one or more subgroup errors chosen by the one or more users from the lowest view level subgroup member; and generating, by the computer device, for the received one or more intolerable risks of the one of the one or more subgroup errors in the lowest view level subgroup member one or more mitigation recommendations by comparing the key performance index and the one of the one or more risk tolerability matrices of the lowest view level subgroup member, wherein
 the one or more mitigation recommendations change the received one or more intolerable risks of the one of the one or more subgroup errors in the lowest view level subgroup member into a non-intolerable risk.

2. The method of claim 1, wherein the plurality of view levels comprise an end-product view, a commodity view, a sub-commodity view, and a task view.

3. The method of claim 1, wherein receiving, by the computer device, an answer for each of the one or more occurrence questions further comprises:
 providing a task card to a first user, wherein the task card comprises the one or more occurrence questions for each of the one or more errors; and
 receiving the task card after the first user fills out answers to the one or more occurrence questions.

4. The method of claim 3, wherein the task card is in the form of a physical card.

5. The method of claim 3, wherein providing the task card to the first user is done through an electronic device.

6. The method of claim 1, wherein each of the one or more risk tolerability matrices comprises an acceptable risk category, a tolerable risk category, and an intolerable risk category.

7. The method of claim 1, wherein the key performance index is calculated by multiplying the detectability value, the occurrence value, and the severity value.

8. The method of claim 1, wherein the answer corresponding to each of the one or more detectability questions comprises a yes or no, and the detectability value is calculated from the number ratio of the yes answers to all the one or more detectability questions.

9. The method of claim 1, wherein the answer corresponding to each of the one or more occurrence questions comprises a yes or no, and the occurrence value is calculated from the number ratio of the yes answers to all the one or more occurrence questions.

10. The method of claim 1, further comprising notifying, by the computer device, the one or more mitigation recommendations to a first user.

11. The method of claim 10, further comprising notifying, by the computer device, at least one of the one or more mitigation recommendations to a second user.

12. The method of claim 11, wherein the at least one risk tolerability matrix for the second user is different from the at least one risk tolerability matrix for the first user.

13. The method of claim 1, further comprising:
 receiving from a second user, by the computer device, one or more mitigation actions; and
 changing, by the computer device, one or more detectability questions according to the one or more mitigation actions.

14. The method of claim 13, wherein the steps are taken in real time.

15. A system for integrated automatic risk management comprising:
 one or more computers comprising program instructions, wherein the program instructions are stored in a non-transitory computer readable medium and executable to perform operations comprising:
 receiving historically identified risk data from a plurality of business domain databases, wherein the plurality of business domain databases comprise a manufacturing domain database, an operation domain database, and a maintenance domain database;

identifying one or more errors from the historically identified risk data, wherein for each of the one or more errors the historically identified risk data comprises:
   a detectability value,
   one or more detectability questions corresponding to the detectability value,
   an answer to each of the one or more detectability questions,
   an occurrence value, and
   a severity value;
calculating for each of the one or more errors the detectability value from the answers corresponding to the one or more detectability questions;
generating for each of the one or more errors one or more occurrence questions corresponding to the occurrence value based on the historically identified risk data;
receiving an answer for each of the one or more occurrence questions from one or more users;
calculating for each of the one or more errors the occurrence value from the answers corresponding to the one or more occurrence questions;
providing a plurality of view levels in a hierarchical relationship with one another defined by at least one upper view level and at least one lower view level, wherein
   each of the plurality of view levels is associated with one or more risk tolerability matrices, and
   one of the one or more risk tolerability matrices of one of the lower view levels contributes to the determination of at least one of the one or more risk tolerability matrices of one of the upper view levels;
displaying a view level subgroup comprising at least one view level subgroup member selected by the one or more users from the one or more view levels, wherein
   each view level subgroup member includes at least one or more subgroup errors, each of the one or more subgroup errors includes one or more intolerable risks, wherein the intolerable risks are highlighted on at least one view level dashboard, and
   the one or more risk tolerability matrices for one of the one or more subgroup errors of a lower view level subgroup member contributes to the determination of one of the one or more risk tolerability matrices for one of the one or more subgroup errors of its upper view level subgroup member;

identifying one or more intolerable risks of the one of the one or more subgroup errors chosen by the one or more users from the lowest view level subgroup member; and generating for the identified one or more intolerable risks of the one of the one or more subgroup errors in the lowest view level subgroup member one or more mitigation recommendations by comparing the key performance index and the one of the one or more risk tolerability matrices of the lowest view level subgroup member, wherein
   the one or more mitigation recommendations change the received one or more intolerable risks of the one of the one or more subgroup errors in the lowest view level subgroup member into a non-intolerable risk.

16. The system of claim 15, wherein the one or more business domain databases is stored in one or more cloud servers.

17. The system of claim 15, further comprising a remote device having a remote access application, wherein the one or more users connects to the one or more computers using the remote access application installed on the remote device.

18. The system of claim 15, wherein the operations further comprise:
   receiving from the one or more users one or more mitigation actions; and
   changing the one or more detectability questions and the one or more occurrence questions according to the one or more mitigation actions.

19. The system of claim 15, wherein the operations further comprise:
   allowing a first access level to a first user, and a second access level to a second user, wherein
      the first access level defines the scope of access and right to change the one or more detectability questions and the one or more occurrence questions of the first user,
      the second access level defines the scope of access and right to change the one or more detectability questions and the one or more occurrence questions of the second user, and
      the first access level and the second access level are different.

* * * * *